(12) United States Patent
Myers et al.

(10) Patent No.: US 11,941,012 B2
(45) Date of Patent: Mar. 26, 2024

(54) USER ACTION SEQUENCE RECOGNITION USING ACTION MODELS

(71) Applicant: SRI International, Menlo Park, CA (US)

(72) Inventors: Karen L. Myers, Menlo Park, CA (US); Melinda T. Gervasio, Mountain View, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 797 days.

(21) Appl. No.: 16/443,618

(22) Filed: Jun. 17, 2019

(65) Prior Publication Data

US 2020/0233865 A1 Jul. 23, 2020

Related U.S. Application Data

(60) Provisional application No. 62/793,768, filed on Jan. 17, 2019.

(51) Int. Cl.
*G06F 7/02* (2006.01)
*G06F 16/00* (2019.01)
*G06F 16/23* (2019.01)
*G06F 16/2458* (2019.01)
*G06F 16/9035* (2019.01)

(52) U.S. Cl.
CPC ...... *G06F 16/2465* (2019.01); *G06F 16/2365* (2019.01); *G06F 16/9035* (2019.01)

(58) Field of Classification Search
CPC ............. G06F 16/2465; G06F 16/9035; G06F 16/903; G06F 16/2365; G06N 20/00; G06N 20/10; G06N 20/20
See application file for complete search history.

(56) References Cited

U.S. PATENT DOCUMENTS 8,694,355 B2  4/2014  Bui et al.
9,046,917 B2  6/2015  Senanayake et al.
(Continued)

OTHER PUBLICATIONS

"Adept Client Application Guide," 2012, retrieved from www.ai.sri.com/pal/PAL-software-downloads/PAL-zipfiles-and-docs/itl-doc/ClientApplicationGuide.html on Feb. 26, 2020, 18 pp.
(Continued)

*Primary Examiner* — Bruce M Moser
(74) *Attorney, Agent, or Firm* — Shumaker & Sieffert, P.A.

(57) ABSTRACT

In general, the disclosure describes techniques for identifying sequences of user actions from event data and logs of user actions for at least one user of a computing system. In one example, a system includes a sequence mining unit that processes event data and logs of user actions for at least one user of a computing system to obtain a set of one or more candidate action sequences each comprising a sequence of one or more user actions. A sequence filtering unit of the system applies, to the set of one or more candidate action sequences, one or more filters informed by a model of user actions for an application domain to obtain a set of one or more filtered action sequences to improve a quality of action sequences identified by the system. An output device of the system outputs an indication of the set of one or more filtered action sequences usable for generating at least one automated workflow or information usable for improving a workflow.

20 Claims, 4 Drawing Sheets

(56) References Cited

U.S. PATENT DOCUMENTS

| | | | |
|---|---|---|---|
| 9,501,745 B2 | 11/2016 | Nitz et al. | |
| 2013/0035796 A1* | 2/2013 | Neilson | G05D 16/2013 700/282 |
| 2013/0035976 A1* | 2/2013 | Buffett | G06F 17/40 705/7.26 |
| 2013/0232494 A1* | 9/2013 | Dolph | G06F 9/543 718/100 |
| 2014/0058789 A1* | 2/2014 | Doehring | G06Q 10/067 705/7.27 |
| 2019/0114041 A1* | 4/2019 | Pitkanen | G06F 16/2458 |
| 2019/0317803 A1* | 10/2019 | Maheshwari | G06N 20/00 |
| 2020/0219033 A1* | 7/2020 | Smutko | G06F 9/4451 |
| 2021/0097082 A1 | 4/2021 | Billa et al. | |
| 2021/0192972 A1 | 6/2021 | Acharya et al. | |

OTHER PUBLICATIONS

"Adept User Guide," 2012, retrieved from www.ai.sri.com/pal/PAL-software-downloads/PAL-zipfiles-and-docs/itl-doc/UserGuide.html on Feb. 26, 2020, 17 pp.

Demaitre, "DENSO, Drishti join forces to apply computer vision to productivity," WTWH Media, LLC., Retrieved Jun. 11, 2021 from: https://www.therobotreport.com/drishti-denso-join-apply-computer-vision-human-productivity/, Feb. 18, 2020, 5 pp.

"HI5 Vr Glove Business Edition," Noitom Ltd., Retrieved Apr. 19, 2021, from: thttps://web.archive.org/web/20190212014355/https://hi5vrglove.com/store/hi5glove, Feb. 12, 2019, 3 pp.

"Mbientlab Inc," MetaMOTION, Retrieved May 17, 2021, from: https://web.archive.org/web/20180525052543/https://mbientlab.com/, May 25, 2018, 5 pp.

"Nansense Gloves," NANSENSE Inc., Retrieved May 17, 2021, from: https://web.archive.org/web/20190904154649/https://www.nansense.com/gloves/, Sep. 4, 2019, 5 pp.

"Fingertps Pressure Sensor System," PPS, Retrieved: https://web.archive.org/web/20190318104006/https://pressureprofile.com/fingertps, Mar. 18, 2019, 3 pp.

"FingerTPS™," PPS, Configurable Hand & Finger Force Measurement System Brochure, Aug. 21, 2019, 5 pp.

"SingleTact," Pressure Profile Systems, Retrieved Jun. 11, 2021 from: https://web.archive.org/web/20190106155822/https://www.singletact.com/, Jan. 6, 2019, 5 pp.

"SingleTact," Pressure Profile Systems, Retrieved Jun. 11, 2021 from: https://web.archive.org/web/20190226151350/http://www.singletact.com/micro-force-sensor, Feb. 26, 2019, 3 pp.

"SingleTact Spec Sheet," https://www.singletact.com/, Retrieved: https://cdn2.hubspot.net/hubfs/5361756/Spec%20Sheets/SingleTact%20Spec%20Sheet,%202017-08-28.pdf, Aug. 28, 2017, 5 pp.

"TactileGlove—Glove Sensor," PPS, Retrieved from: http://web.archive.org/web/20190318104040if_/https://pressureprofile.com/tactile-glove, Mar. 18, 2019, 3 pp.

"TactileGlove Spec Sheet," PPS, Retrieved from: https://pressureprofile.com/body-pressure-mapping/tactile-glove, Jun. 17, 2020, 5 pp.

"DIGITACTS—Pressure Mapping Solutions," PPS, Retrieved May 17, 2021 from: http://web.archive.org/web/20190318103747/https://pressureprofile.com/digitacts-sensors, Mar. 18, 2019, 2 pp.

"Prime One—The All-round VR Gloves by Manus VR," Gadgenda, Retrieved Jun. 11, 2021 from: https://www.gadgenda.com/prime-one-the-all-round-vr-gloves-by-manus-vr, Oct. 3, 2019, 2 pp.

Graham, "Going (Literally) Hands-On With Manus Prime Haptic Gloves," Retrieved Jun. 11, 2021 from: https://www.vrfocus.com/2019/09/going-literally-hands-on-with-manus-prime-haptic-gloves/, Sep. 16, 2019, 5 pp.

"World's leading VR Gloves for training," MANUS VR, Retrieved Jun. 11, 2021 from: https://web.archive.org/web/20190712231536/https:/manus-vr.com/, Jul. 12, 2019, 2 pp.

"Prime One: the new era of hand tracking," MANUS VR, Retrieved Jun. 11, 2021 from: https://web.archive.org/web/20200512104847/https:/manus-vr.com/prime-one-gloves/, May 12, 2020, 2 pp.

"Prime Series Infokit 2019," MANUS, Nov. 18, 2019, 8 pp.

"CyberGlove III," CyberGlove Systems, Retrieved May 17, 2021 from: https://web.archive.org/web/20191129120551/http://www.cyberglovesystems.com/cyberglove-iii, Jan. 29, 2019, 5 pp.

"CyberGlove Data Sheet," CyberGlove Systems, Sep. 21, 2015, 2 pp.

* cited by examiner

| NO. | CANDIDATE FILTER | DESCRIPTION |
|---|---|---|
| 301 | Precondition | Discards candidates with any action having an unsatisfied or unsatisfiable precondition. |
| 302 | Start | Discards candidates that do not begin with an action that starts a process. |
| 303 | Finalize | Discards candidates that do not end with an action that completes a process. |
| 304 | Complete | Discards candidates that have an action that starts (ends) a process without a matching action that ends (starts) it. |
| 305 | Branch | Discards candidates that do not start with a recognized branching action. |

FIG. 3

| NO. | ACTION FILTER | DESCRIPTION |
|---|---|---|
| 401 | Contribution | Discards actions in a sequence that are not required by any succeeding action or that do not require any preceding action in a sequence. |
| 402 | Duplicate | Discards immediate repeated actions in a sequence. |

FIG. 4

USER ACTION SEQUENCE RECOGNITION USING ACTION MODELS

This application claims the benefit of U.S. Provisional Application No. 62/793,768 by Myers et al., entitled "WORKFLOW RECOGNITION AND AUTOMATION VIA SEQUENCE MINING INFORMED BY ACTION MODELS," and filed on Jan. 17, 2019. The entire content of Application No. 62/793,768 is incorporated herein by reference.

GOVERNMENT RIGHTS

This invention was made with government support under contract no. N00014-15-C-5040 awarded by the Office of Naval Research. The Government has certain rights in this invention.

TECHNICAL FIELD

This disclosure generally relates to analyzing user interactions with computing devices.

BACKGROUND

Data collection systems collect extensive data about how human users interact with computational devices (e.g., apps, enterprise software, browsers, email). These data collection systems generate large logs of user actions. The information within the logs of user actions may be extremely valuable yet is significantly underutilized to date. Some systems in enterprise settings have used the information within the logs of user actions to perform compliance checking. For example, the logs of user actions may be used to determine whether user actions follow pre-specified models of how processes are to be performed. However, models of those processes are laboriously compiled by hand.

Automated analysis of logs of user actions to date has focused on "sequence mining" techniques. Sequence mining determines frequent, repeated sequences of actions from logs of user actions. For example, an automated sequence mining system may analyze event data and logs of user actions to identify patterns that occur repeatedly, and which may be indicative of a higher-level workflow of the user. Conventional automated sequence mining techniques perform purely statistical analysis of the logs to identify such repeated patterns. Sequence mining may be used, for example, to compare prescribed workflows with modeled workflows within an organization to identify deviations in the logs of user actions.

Sequence mining is complicated by the fact that users may perform extraneous actions and may interleave actions from multiple processes due to multi-tasking, interruption, or distractions. Conventional algorithms have been designed to tolerate "noise" and extraneous information within logs of user actions, but these conventional algorithms do not work well enough in practice to be used broadly. Furthermore, conventional sequence mining that relies on statistical techniques may require large quantities of data to obtain statistically useful action sequences, making sequence mining impractical for data sets where large quantities of data are impractical to obtain.

SUMMARY

In general, the disclosure describes techniques for identifying sequences of user actions from event data and logs of user actions for at least one user of a computing system. For example, a system may obtain a set of one or more candidate action sequences, each of the candidate action sequences including a sequence of one or more actions or events. Using one or more filters informed by a model of user actions and/or events developed for an application domain, the system can filter the candidate action sequences to discard action sequences that do not conform to the one or more filters as informed by the model of user actions, resulting in a filtered set of action sequences that are therefore more likely to represent actual workflows of a user interacting with the computing system. Thus, a model of user actions may be used as described herein to inform sequence mining so as to improve the quality of action sequences identified by the system. The system may use these high-quality action sequences to generate automations of the workflows of the at least one user, explanations for workflow automations, or other suggestions to improve the workflows of the at least one user.

Accordingly, the techniques of the disclosure may provide one or more practical applications of specific technical improvements to the field of sequence mining. For example, the techniques of the disclosure may improve the quality of statistical sequence mining by exploiting background models of user actions in the domain. As described herein, action sequences of higher quality better reflect higher level human workflows such that the high quality action sequences may be more useful and relevant to systems and software that use the information described by the action sequences to generate automated workflows or to generate recommendations for improving the workflows. Because the models characterize, e.g., parameters of actions, conditions under which an action can be performed, and expected effects of the actions, the models can be used to define filters that identify non-conforming action sequences that do not make "sense" (e.g., are inconsistent with the model) because the user actions are not connected in a meaningful way, for instance. In addition to improving the quality of action sequences identified by the system, the techniques of the disclosure may allow for more meaningful analysis of such action sequences so as to enable the system to automate such workflows, as well as enabling the system to autonomously determine when to proactively initiate such workflows. The action model may also or alternatively enable the system to provide explanations for the workflows that have been automated. Furthermore, a system as described herein may learn useful action sequences from a much smaller amount of data than sequence mining techniques that rely solely on statistical analysis, thereby allowing the use of sequence mining where large quantities of data are not easily obtainable.

In one example, this disclosure describes a system for identifying action sequences of user actions for at least one user of a computing system, the system executing on processing circuitry and comprising: a sequence mining unit configured to process event data and logs of user actions for at least one user of a computing system to obtain a set of one or more candidate action sequences each comprising a sequence of one or more user actions; a sequence filtering unit configured to apply, to the set of one or more candidate action sequences, one or more filters based on a model of user actions for an application domain to obtain a set of one or more filtered action sequences to improve a quality of action sequences identified by the system; and an output device configured to output an indication of the set of one or more filtered action sequences usable for generating at least one automated workflow or information usable for improving a workflow.

In another example, this disclosure describes a method for identifying action sequences of user actions for at least one user of a computing system, the method comprising: processing, by a sequence mining unit, event data and logs of user actions for at least one user of a computing system to obtain a set of one or more candidate action sequences each comprising a sequence of one or more user actions; applying, by a sequence filtering unit and to the set of one or more candidate action sequences, one or more filters based on a model of user actions for an application domain to obtain a set of one or more filtered action sequences to improve a quality of action sequences identified by the system; and outputting, by an output device, an indication of the set of one or more filtered action sequences usable for generating at least one automated workflow or information usable for improving a workflow.

In another example, this disclosure describes a non-transitory computer-readable medium comprising instructions that, when executed, cause processing circuitry to: process event data and logs of user actions for at least one user of a computing system to obtain a set of one or more candidate action sequences each comprising a sequence of one or more user actions; apply, to the set of one or more candidate action sequences, one or more filters based on a model of user actions for an application domain to obtain a set of one or more filtered action sequences to improve a quality of action sequences identified by the system; and output an indication of the set of one or more filtered action sequences usable for generating at least one automated workflow or information usable for improving a workflow.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 3 is a table illustrating examples of candidate filters in accordance with the techniques of the disclosure.

FIG. 4 is a table illustrating examples of action filters in accordance with the techniques of the disclosure.

Like reference characters refer to like elements throughout the figures and description.

DETAILED DESCRIPTION

Very little analysis has been performed on logs of user actions in enterprise or non-enterprise settings. It is believed that logs of user actions could be exploited to provide significantly more value to organizations of various types. For example, a sequence mining system as described herein may automatically capture performance models by learning what kinds of processes users perform in practice. Additionally, the sequence mining system of the present disclosure may proactively automate multi-step tasks that are performed repeatedly, thus potentially saving large amounts of time and effort by human users. In some examples, the sequence mining system of the present disclosure may further generate explanations for workflow automations or performance models, or generate suggestions for improving the workflows of users.

Figure 1:
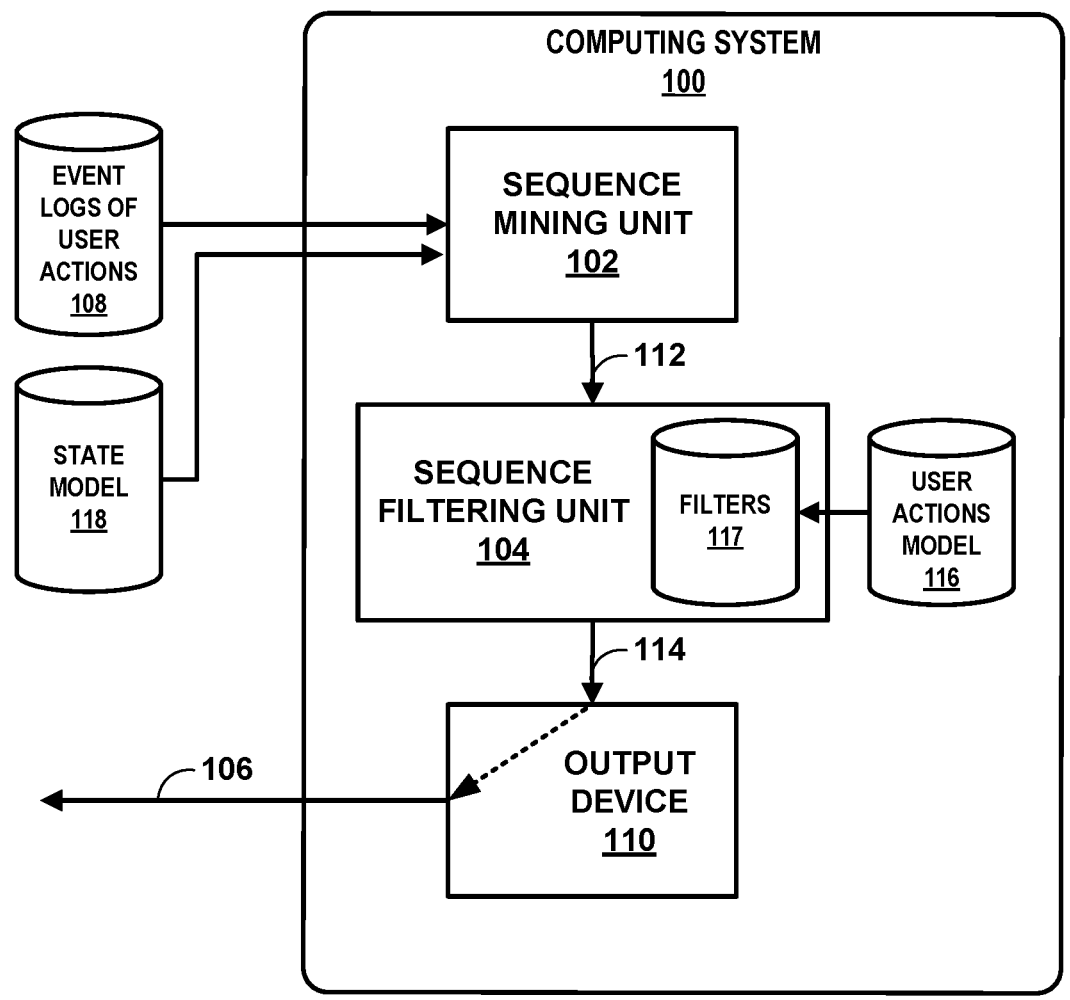
FIG. 1 is a block diagram of an example system for identifying sequences of user actions from logs of user actions and an environmental state model of events in accordance with the techniques of the disclosure.

FIG. 1 is a block diagram of example system 100 for identifying sequences of user actions from logs of user actions 108 and environmental state model of events 118 in accordance with the techniques of the disclosure. In the example of FIG. 1, computing system 100 processes logs of user actions 108 and environmental state model of events 118 to generate and output filtered action sequences 114. Computing system 100 includes sequence mining unit 102, sequence filtering unit 104, and output device 110. In some examples, computing system 100 includes one or more computing devices interconnected with one another, such as one or more mobile phones, tablet computers, laptop computers, desktop computers, servers, Internet of Things (IoT) devices, autonomous vehicles, robots, etc. System 100 is an example of a sequence mining system.

Logs 108 include one or more logs of user actions. Typically, the logs of user actions include logs of actions between a user and a computing system. The logs of actions may involve interactions between the user and one or more software applications of the computing system, between different software applications of the computing system, or combinations thereof. For example, such actions may refer to data that describes actions of the system (e.g., actions that have previously occurred). In some examples, the logs of interactions may include interactions for multiple users, for example, in an enterprise setting different where multiple users perform different parts of a complex process. The user actions may include, for example, input received from a user via a user interface, such as a command-line interface (CLI), graphical user interface (GUI), a physical input device such as a mouse, keyboard, joystick, or commands, audio received via a voice interface, or video or images received via one or more image capture devices. Further, the interactions may include responses, actions, and behavior of the computing system in response to the user actions.

In some examples, computing system 100 further includes environmental state model of events 118. Events 118 may include data relevant to how a workflow is conducted. For example, such event data may describe when a user reacts to an event or events that influence how the user operates or interacts with the system. Environmental state model of events 118 defines, e.g., a state of an environment of computing system 100. Environmental state model 118 is state-driven and may frequently change as the state of the environment changes. State information of state model 118 may be used in the filtering and learning processes described below.

User actions may occur in a series or "sequence" of user actions whereby a user performs a number of user actions sequentially in order to accomplish some task. For example, a user that seeks to send an email may (1) open an email application; (2) create a new email template; (3) enter one or more email addresses; (4) enter text into the email; and (5) send the email. This sequence of actions or a subset thereof constitutes an action sequence. Any sequence of user interactions with a computing system that can be logged by the computing system may constitute an action sequence.

Sequence mining unit 102 processes logs of user actions 108 to generate one or more candidate action sequences 112 of the user. In some examples, sequence mining unit 102 relies solely on a model-free, purely statistical approach to identify patterns of user actions that occur repeatedly and may therefore constitute a candidate action sequence that is, for instance, a candidate for workflow automation. Sequence mining unit 102 may infer that such frequent patterns of user actions may be indicative of a higher-level workflow of the user. Sequence mining unit 102 outputs such frequent patterns of user actions as candidate action sequences 112 to sequence filtering unit 104. As discussed in more detail below, candidate action sequences 112 may be statistically relevant sequences of user actions but may include one or more sequences of user actions that are incorrectly identified as significant as a result of statistical accident but are not semantically coherent. Reliance on statistical techniques may require large quantities of data to obtain action sequences that are statistically useful. Thus, statistical analysis alone may be inadequate or impractical for settings where large quantities of data are unavailable or difficult to obtain. As described below, sequence filtering unit 104 may allow for obtaining actions sequences of a higher quality over the use of sequence mining unit 102 alone.

Additional information with respect to techniques for sequence mining is provided by U.S. Pat. No. 9,046,917 to Senanayake et al., entitled "DEVICE, METHOD AND SYSTEM FOR MONITORING, PREDICTING, AND ACCELERATING INTERACTIONS WITH A COMPUTING DEVICE," filed on Jun. 27, 2012 and issued on Jun. 2, 2015; U.S. Pat. No. 8,694,355 to Bui et al., entitled "METHOD AND APPARATUS FOR AUTOMATED ASSISTANCE WITH TASK MANAGEMENT," filed on Jun. 1, 2009 and issued on Apr. 8, 2014; and U.S. Pat. No. 9,501,745 to Nitz, et al., entitled "METHOD, SYSTEM, AND DEVICE FOR INFERRING A MOBILE USER'S CURRENT CONTEXT AND PROACTIVELY PROVIDING ASSISTANCE," filed on Apr. 2, 2015 and issued on Nov. 22, 2016. The entire content of each of U.S. Pat. Nos. 9,046,917, 8,694,355, and 9,501,745 is incorporated herein by reference.

Conventional systems for sequence mining have not had much impact to date because the quality of such conventional sequence mining techniques has been inadequate for practical use or widespread adoption. For example, conventional sequence mining techniques do not seek to automate the learning of procedures or to explain the results. One significant limitation of conventional sequence mining techniques is that they are driven purely by statistical properties of the log content. The result is that conventional sequence mining techniques may generate candidate "workflows" that are not semantically coherent e.g., workflows that are nonsensical but are identified nonetheless as a result of statistical accident. Such statistical accidents occur more frequently within sequence mining algorithms designed to be robust to noise.

Another significant limitation of conventional sequence mining techniques is that they assume that actions are atomic. For example, a conventional system may identify a "delete file" action or a "send email" action. However, because conventional systems do not model the key actors and objects in the actions, these actions may be included in action sequences where the overall action sequence is not comprehensible, for example, with reference to the respective examples above, where the identified action sequence does not include an initial action that specifies the name of the file to be deleted, or where the identified action sequence does not include an action that specifies a recipient of the email to be sent.

The techniques of the disclosure may improve the quality of statistical sequence mining by exploiting one or more background models of actions in the domain. Specifically, the techniques of the disclosure allow for the modeling of actions and action sequences to obtain detailed information about the actors and objects that enables better ways of determining whether mined sequences make sense. Further, a system as described herein may obtain detailed characterization of an action or action sequence such that the system may generate automations for workflows described by the action sequences.

For example, with respect to FIG. 1, sequence filtering unit 104 applies one or more filters 117 informed by user action model 116 to candidate action sequences 112 to obtain filtered action sequences 114. User action model 116 is a model of user actions within an application domain. In some examples, user action model 116 is built by a human domain expert for a specific application domain. However in other examples, computing system 100 may autonomously generate user action model 116 by learning actions of one or more users of the application domain. User action model 116 may require a one-time cost to create, but this cost may be quickly amortized given the benefits that process understanding and automation may provide to the user workflow. In some examples, user action model 116 specifies background information, such as goals and tasks of the application domain. For example, in an enterprise, user action model 116 may describe an organizational structure that may provide information for an email workflow as to who sent an email to whom, or that a first user reports directly to a second user. The use of such background information may allow for the creation of smarter or more general filters 117, as described below.

Each of filters 117 specifies a characteristic of an invalid action sequence or an extraneous action of an action sequence. Filters 117 may be informed by user action model 116. In some examples, a human domain expert generates filters 117 based on user action model 116. Sequence filtering unit 104 may apply filters 117 to candidate action sequences to require actions of a candidate action sequence, and the candidate action sequence itself, to conform to filters 117. The use of filters 117 allows sequence filtering unit 104 to verify that a candidate action sequence is a valid action sequence composed of valid actions, as informed by user action model 116.

User action model 116 may characterize parameters of actions, conditions under which an action can be performed, and expected effects of the actions. User action model 116 may draw on a standard representation of actions within the Artificial Intelligence (AI) community. For example, user action model 116 may define a StartTransaction action in terms of parameters that include the ID of the person initiating the transaction and the type of the transaction. User action model 116 may further define a precondition for the StartTransaction action that requires the identified person to have authority to initiate such a transaction. Furthermore, user action model 116 may require the StartTransaction action to produce an effect, e.g., that the StartTransaction action generates a TransactionID. As another example, user action model 116 may specify that an EndTransaction action has a TransactionID as a parameter and impose a precondition that a transaction with the same TransactionID has not previously ended. As discussed further below, the use of such parameterized models may allow for high quality workflow modeling as well as enabling workflow automation and explanation.

As an example, a domain expert may generate a user action model 116 that includes a "delete file" action, which specifies the file to be removed along with the precondition that the file exist before the "delete file" action can be performed and that the file will be removed from its host directory after the "delete file" action is performed. As another example, user action model 116 may specify that a "send email" action requires an indication of sender, a recipient, and the content of the email. A precondition for the "send email" action could be that the sender and recipient are valid email addresses. Further, the user action model 116 may specify that the "send email" action has an effect that after the "send email" action is performed, the email has been sent from the sender to the recipient. As another example, user action model 116 may specify that an "encrypt file" action requires a key to encrypt the file, such that an action sequence that includes an "encrypt file" action should include a preceding action that generates the key. Sequence filtering unit 103 may use domain-independent filters 117 that are based on a principle that preconditions for an action, as specified by user action model 116, must be satisfied before an action can be executed. Such filters 117 may work for any domain for which user action model 116 specifies relevant preconditions and effects of individual actions.

In some examples, sequence filtering unit 104 may significantly improve the quality of sequence mining through the use of user action model 116 to define filters 117 that filter out candidate action sequences 114 that do not make "sense" (e.g., are inconsistent with user action model 116) because the actions of an action sequence are not connected in a meaningful way (or the action sequence itself is not meaningful). In some examples, a human, such as a domain expert, generates, from user action model 116, one or more filters that sequence filtering unit 104 may apply to candidate action sequences 112 to obtain filtered action sequences 114. Each of the one or more filters specifies, e.g., a characteristic of an invalid candidate action sequence or an extraneous action in an invalid candidate action sequence.

In some examples, the filters are candidate filters that cause sequence filtering unit 104 to discard invalid action sequences from the candidate action sequences 112 to obtain filtered action sequences 114. Each candidate filter may cause sequence filtering unit 104 to discard one or more action sequences as invalid based on a determination that the action sequence does not satisfy one or more conditions of the candidate filter. Examples of invalid action sequences include:
  an action sequence that does not begin with a user action that starts a valid action sequence;
  an action sequence that does not end with a user action that ends a valid action sequence;
  an action sequence that has an action that starts a process but does not end with a matching action that ends the process;
  an action sequence that does not begin with a user action that starts a valid branching user action; or
  the action sequence does not satisfy one or more preconditions from the model of user actions for the application domain at the point in the sequence where it would be executed.

In some examples, the filters are action filters that cause sequence filtering unit 104 to discard irrelevant user actions from an action sequence of candidate action sequences 112 to obtain filtered action sequences 114. Each action filter may cause sequence filtering unit 104 to discard one or more user actions as irrelevant based on a determination that the user action does not satisfy one or more conditions of the action filter. Examples of invalid action sequences include:
  a user action that is not required by a subsequent user action of the action sequence;
  a user action that does not require any preceding user actions of the action sequence; or
  a user action that is a duplicate of another one or more user actions of the action sequence.

Additionally, or in the alternative, a candidate filter may specify one or more preconditions. The preconditions associated with actions and/or action sequences can be analyzed to identify states in which learned procedures may be applied, thus providing a basis for proactively making suggestions to the user for automating tasks on his behalf. In addition, the preconditions and effects of an action sequence characterize the causal structure of the procedure: what the procedure does, when the procedure may be performed (e.g., expressed as a set of preconditions that must be satisfied at the start of the action sequence so that each action in the sequence has its preconditions satisfied when that action is executed within the sequence), and why the procedure would be done (e.g., expressed as a set of effects that accumulate upon executing in order each action of the action sequence from a state in which the preconditions for the overall sequence are satisfied). System 100 may use this information to generate explanations to a user to accompany suggestions for task automation.

In some examples, a filter may specify one, more than one, or a combination of the above examples of invalid action sequences. In other examples, a filter may specify valid action sequences. Furthermore, a filter may draw on other standard representations of actions within the AI community that are not expressly set forth herein.

Output device 110 generates output 106 indicative of filtered action sequences 114, which may be usable for generating one or more automated workflows. In some examples, output 106 is one or more filtered action sequences 106 that output device 110 presents for display to a user. In other examples, output 106 is an indication of filtered action sequences 106 which may be used by another component of computing system 100 not depicted in FIG. 1, e.g., for use in automating procedure learning or generating an explanation of a suggestion for automating the procedure. Additional description of such automated procedure learning and learned procedure explanation is provided subsequently with respect to FIG. 2.

The use of such filters may significantly improve the quality of extracted action sequences. In other words, the use of such filters may allow system 100 to define filtered action sequences 114 that are of significantly higher quality and useful as compared to candidate action filters 112 or action sequences generated by conventional techniques. For example, the use of user action model 116 allows for an explicit modeling of action parameters. In turn, this allows one to generalize one of filtered action sequences 114 such that the generalized action sequence may be applied to a broad range of settings, applications, or environments. For example, one may apply proprietary procedure learning technology to filtered action sequences 114 to create parameterized, automated procedures that may automate a family of tasks related to the filtered action sequences 114 as described in more detail with respect to FIG. 2. Further, the use of user action model 116 allows for the generation of explanations of filtered action sequences 114 and the user workflows represented by filtered action sequences 114, as described in more detail with respect to FIG. 2.

Accordingly, the techniques of the disclosure may provide significant improvements to sequence mining as compared to conventional systems that perform purely statistical sequence mining. For example, the techniques of the disclosure may improve the quality of statistical sequence mining by exploiting background models of user actions in the domain. These user actions characterize parameters of actions, conditions under which an action can be performed, and expected effects of the actions. The improved quality of sequence mining afforded by this technique also opens the door to proactively automating workflows and to providing explanations for the automation. Furthermore, while conventional statistical techniques may require large quantities of data to obtain statistically useful action sequences, a system as described herein may learn useful action sequences from a much smaller amount of data, thereby allowing the use of action sequencing where large quantities of data are not easily obtainable.

Figure 2:
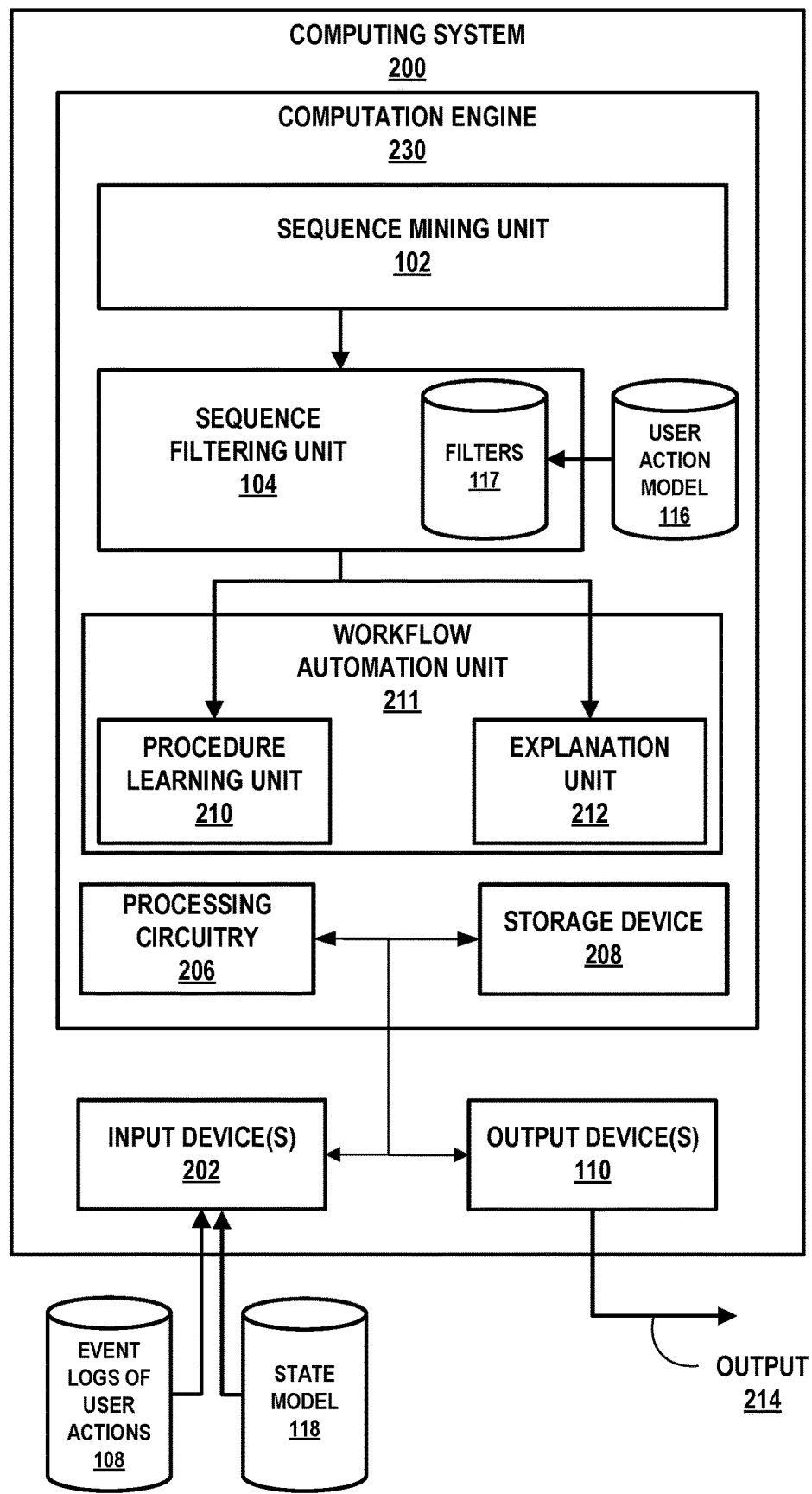
FIG. 2 is a block diagram of a computing device configured to execute the sequence mining system of FIG. 1.

FIG. 2 is a block diagram of computing system 200 configured to execute the sequence mining system of FIG. 1. In the example of FIG. 2, computing system 200 includes computation engine 230, one or more input devices 202, and one or more output devices 110. In some examples, computing system 200 includes one or more computing devices interconnected with one another, such as one or more mobile phones, tablet computers, laptop computers, desktop computers, servers, Internet of Things (IoT) devices, etc.

In the example of FIG. 2, computing system 200 may provide user input to computation engine 230 via one or more input devices 202. A user of computing system 200 may provide input to computing system 200 via one or more input devices 202, which may include a keyboard, a mouse, a microphone, a touch screen, a touch pad, or another input device that is coupled to computing system 120 via one or more hardware user interfaces.

Input devices 202 may include hardware and/or software for establishing a connection with computation engine 230. In some examples, input devices 202 may communicate with computation engine 230 via a direct, wired connection, over a network, such as the Internet, or any public or private communications network, for instance, broadband, cellular, Wi-Fi, and/or other types of communication networks, capable of transmitting data between computing systems, servers, and computing devices. Input devices 202 may be configured to transmit and receive data, control signals, commands, and/or other information across such a connection using any suitable communication techniques to receive the sensor data. In some examples, input devices 202 and computation engine 230 may each be operatively coupled to the same network using one or more network links. The links coupling input devices 202 and computation engine 230 may be wireless wide area network link, wireless local area network link, Ethernet, Asynchronous Transfer Mode (ATM), or other types of network connections, and such connections may be wireless and/or wired connections.

Output device 110 may include a display, sound card, video graphics adapter card, speaker, presence-sensitive screen, one or more USB interfaces, video and/or audio output interfaces, or any other type of device capable of generating tactile, audio, video, or other output. Output device 110 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, output device 110 may produce an output to a user in another fashion, such as via a sound card, video graphics adapter card, speaker, presence-sensitive screen, one or more USB interfaces, video and/or audio output interfaces, or any other type of device capable of generating tactile, audio, video, or other output. In some examples, output device 110 may include a presence-sensitive display that may serve as a user interface device that operates both as one or more input devices and one or more output devices.

Computation engine 230 includes sequence mining unit 102, sequence filtering unit 104, and workflow automation unit 211. Each of components 102 and 104 may operate in a substantially similar fashion to the like components of FIG. 1. Computation engine 230 may represent software executable by processing circuitry 206 and stored on storage device 208, or a combination of hardware and software. Such processing circuitry 206 may include any one or more of a microprocessor, a controller, a digital signal processor (DSP), an application specific integrated circuit (ASIC), a field-programmable gate array (FPGA), or equivalent discrete or integrated logic circuitry. Storage device 208 may include memory, such as random-access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them.

In some examples, sequence mining unit 102 processes logs of user actions 108 to generate one or more candidate action sequences 112 of the user. In some examples, sequence mining unit 102 relies solely on a model-free, purely statistical approach to identify patterns of user actions that occur repeatedly. Sequence mining unit 102 may infer that such frequent patterns of user actions may be indicative of a higher-level workflow of the user. Sequence mining unit 102 outputs such frequent patterns of user actions as candidate action sequences 112 to sequence filtering unit 104.

Sequence filtering unit 104 applies one or more filters 117 informed by user action model 116 to candidate action sequences 112 to obtain filtered action sequences 114. User action model 116 is a model of user actions within an application domain. Filters 117 may be informed by user action model 116. In some examples, a human domain expert generates filters 117 based on user action model 116. Sequence filtering unit 104 may apply filters 117 to candidate action sequences to require actions of a candidate action sequence, and the candidate action sequence itself, to conform to filters 117. The use of filters 117 allows sequence filtering unit 104 to verify that a candidate action sequence is a valid action sequence composed of valid actions, as informed by user action model 116.

In some examples, sequence filtering unit 104 applies one or more filters 117 to candidate action sequences 112 to obtain filtered action sequences 114. Each of the one or more filters 117 specifies a characteristic of an invalid candidate action sequence or an extraneous action in an invalid candidate action sequence. As an example, the filters may be candidate filters that cause sequence filtering unit 104 to discard invalid action sequences from the candidate action sequences 112 based on a determination that the action sequence does not satisfy one or more conditions of the candidate filter. In addition, or alternatively, the filters may be action filters that cause sequence filtering unit 104 to discard invalid user actions from an action sequence of candidate action sequences 112 based on a determination that the user action does not satisfy one or more conditions of the action filter.

Workflow automation unit 211 generates, from filtered action sequences 106, one or more automated workflows and one or more explanations for the automated workflows that indicate a basis of the set of one or more filtered action sequences 106. Workflow automation unit 211 includes procedure learning unit 210 and explanation unit 212.

Procedure learning unit 210 of workflow automation unit 211 processes filtered action sequences 106 to perform automated procedure learning of user workflows. By learning from filtered action sequences 106 that are of high quality obtained using the techniques set forth above, procedure learning unit 210 may enhance the quality of procedure learning because procedure learning unit 210 is able to learn from higher quality data (e.g., by reducing the occurrence of invalid or nonsensical action sequences and/or by only learning from relevant, valid action sequences). Procedure learning unit 210 may generalize one of filtered action sequences 114 such that the generalized action sequence may be applied to a broad range of settings, applications, or environments. For example, procedure learning unit 210 may process filtered action sequences 114 to create parameterized, automated procedures that may automate a family of tasks related to the filtered action sequences 114. In other words, procedure learning unit 210 may process filtered action sequences 114 to determine a generalized procedure for a set of action sequences, wherein the generalized procedure includes one or more user actions as an input parameter for the automated procedure so as to create a generalized procedure for the set of action sequences. By examining preconditions associated with actions and/or action sequences, procedure learning unit 210 may identify states in which learned procedures may be applied, thus providing a basis for proactively making suggestions to the user for automating tasks on his behalf. Therefore, procedure learning unit 210 may generate automated workflows so as to suggest one or more automations to workflows of the user.

An example of a procedure learning unit 210 that may use filtered action sequences 114 to create parameterized, automated procedures is the Adept system by SRI International and available at http://www.ai.sri.com/pal/PAL-software-downloads/PAL-zipfiles-and-docs/itl-doc/ClientApplicationGuide.html and http://www.ai.sri.com/pal/PAL-software-downloads/PAL-zipfiles-and-docs/itl-doc/UserGuide.html. Additional information with respect to techniques for learning user interaction with a computing device is provided by U.S. Pat. No. 9,046,917 to Senanayake et al., referenced above. Additional information with respect to techniques for automating task management is provided by U.S. Pat. No. 8,694,355 to Bui et al., referenced above. Additional information with respect to techniques for automatically inferring a user-specific context with an electronic device is provided by U.S. Pat. No. 9,501,745 to Nitz, et al., referenced above. The entire content of each of U.S. Pat. Nos. 9,046,917, 8,694,355, and 9,501,745 is incorporated herein by reference.

Explanation unit 212 of workflow automation unit 211 processes filtered action sequences 106 to generate an explanation for learned procedures and/or automated workflows generated by procedure learning unit 210. For example, user action model 116 documents the causality in a mined action sequence. The preconditions and effects of an action sequence characterize the causal structure of the procedure: what the procedure does, when the procedure may be performed (the required preconditions of the procedure), and why the procedure would be done (e.g., the accumulated effects of the procedure). By examining preconditions and effects associated with actions and/or action sequences, explanation unit 212 may generate explanations to a user to accompany suggestions for task automation, which may be output via output device(s) 110 to the user. Thus, explanation unit 212 may use user action model 116 to provide a basis for what each filtered action sequence 114 does, why the filtered action sequence 114 would be performed, or otherwise indicate why the filtered action sequence could or should be used as a basis for an automated workflow. This information may be useful both for understanding the rationale of mined action workflows produced by computing system 200 and for understanding the rationale for suggested automations to the mined action workflows.

Two classes of heuristics have been identified here that take advantage of user action model 116 for application to candidate action sequences 112 to obtain filtered action sequences 114. Candidate filters (described below with respect to FIG. 3) eliminate action sequences from candidate action sequences 112 discovered by sequence mining unit 102. Action filters (described below with respect to FIG. 4) eliminate actions from within an action sequence of candidate action sequences 112 that appear to have no purpose relative to the other user actions in the action sequence.

By generating filters 117 from user action model 116, sequence filtering unit 104 may improve quality in sequence mining because sequence filtering unit 104 may use such filters to recognize sequences that are not "causally coherent." For example, one could not have a coherent sequence that had an EndTransaction precede a StartTransaction, or that included an EndTransaction but no StartTransaction. Thus, the use of user action model 116 may allow one to define filters 117 that sequence filtering unit 104 may apply to remove invalid or nonsensical action sequences from candidate action sequences 112 to obtain filtered action sequences 114 that are of high quality, high relevance, and highly accurate to the user workflows represented by such action sequences.

FIG. 3 is a table illustrating examples of candidate filters in accordance with the techniques of the disclosure. In some examples, the candidate filters of FIG. 3 are examples of filters 117 of FIG. 1. Each candidate filter causes sequence filtering unit 104 to discard an action sequence as invalid.

Candidate filter 301 is a precondition filter. Candidate filter 301 specifies that an action sequence is invalid if the action sequence includes an action that has an unsatisfied or unsatisfiable condition.

Candidate filter 302 is a start filter. Candidate filter 302 specifies that an action sequence is invalid if the action sequence does not begin with a user action that starts a valid action sequence.

Candidate filter 303 is a finalize filter. Candidate filter 303 specifies that an action sequence is invalid if the action sequence does not end with a user action that ends a valid action sequence.

Candidate filter 304 is a complete filter. Candidate filter 304 specifies that an action sequence is invalid if the action sequence has an action that starts a process but does not end with a matching action that ends the process.

Candidate filter 305 is a branch filter. Candidate filter 305 specifies that an action sequence is invalid if the action sequence does not begin with a user action that starts a valid branching user action.

FIG. 4 is a table illustrating examples of action filters in accordance with the techniques of the disclosure. In some examples, the action filters of FIG. 4 are examples of filters 117 of FIG. 1. Each action filter causes sequence filtering unit 104 to discard an action of an action sequence as invalid.

Action filter 401 is a contribution filter. Action filter 401 specifies that an action is invalid if the action is not required by any succeeding action or if the action does not require any preceding action.

Action filter 402 is a duplicate filter. Action filter 401 specifies that an action is invalid if the action is a duplicate of another action in the action sequence. For example, an action that is an immediate repeat of a preceding action is invalid and discarded.

The candidate filters depicted in FIG. 3 and the action filters depicted in FIG. 4 are provided as examples only. The techniques of the disclosure may use filters as described herein alone, or in combination with one another or other types of filters not expressly described herein.

Figure 5:
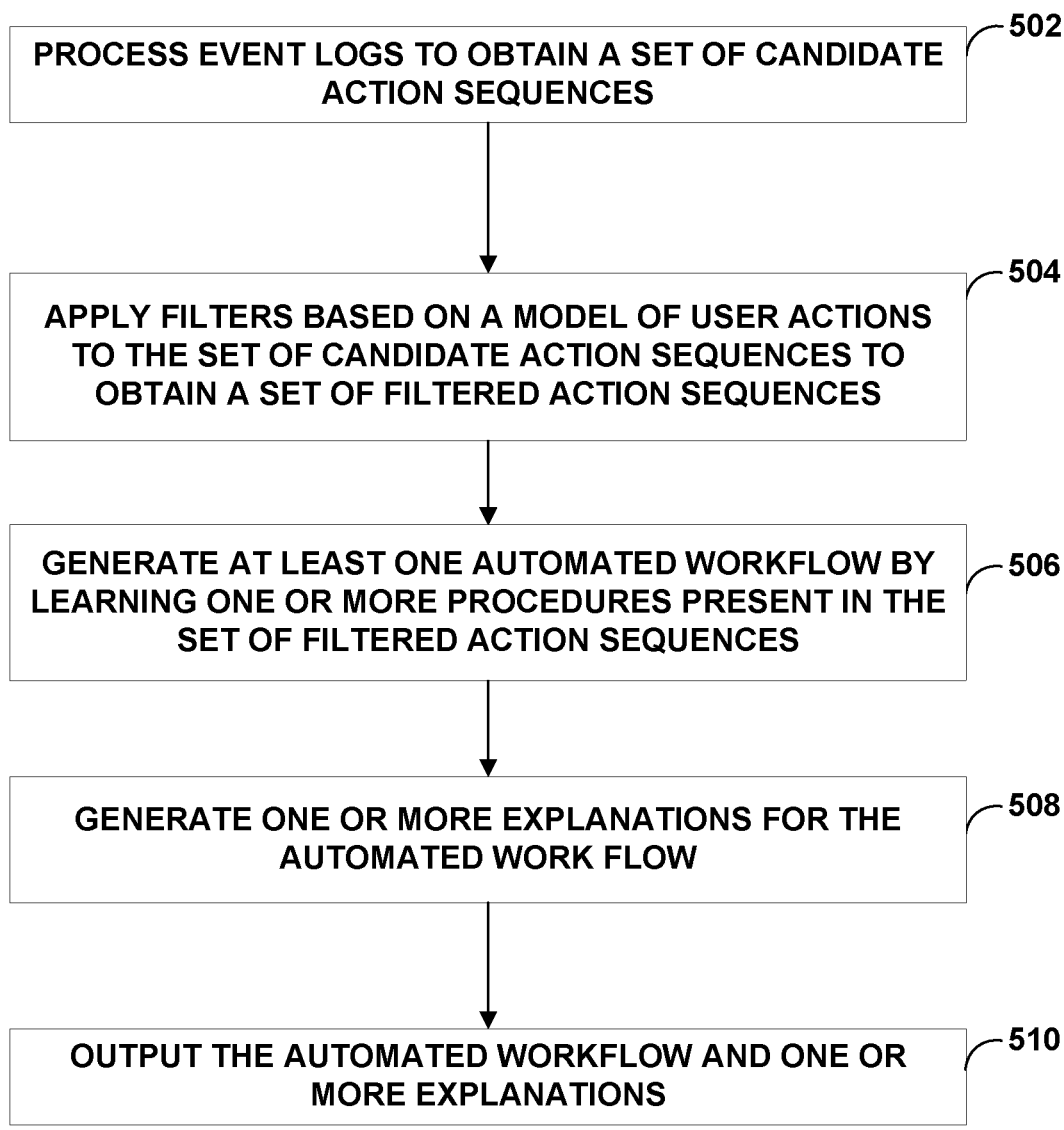
FIG. 5 is a flowchart illustrating an example operation for generating automated workflows in accordance with the techniques of the disclosure.

FIG. 5 is a flowchart illustrating an example operation for generating automated workflows in accordance with the techniques of the disclosure. For convenience, FIG. 5 is described with respect to computing system 200 of FIG. 2. However, the operation of FIG. 5 may be performed by other systems implementing the techniques of the disclosure, such as the computing system 100 of FIG. 1.

In the example of FIG. 5, sequence mining unit 102 processes logs of user actions 108 to generate a set of one or more candidate action sequences 112 of the user (502). In some examples, sequence mining unit 102 relies solely on a model-free, purely statistical approach to identify patterns of user actions that occur repeatedly. Sequence mining unit 102 may infer that such frequent patterns of user actions may be indicative of a higher-level workflow of the user. Sequence mining unit 102 outputs such frequent patterns of user actions as the set of one or more candidate action sequences 112 to sequence filtering unit 104.

Sequence filtering unit 104 applies one or more filters 117 based on user action model 116 to the set of one or more candidate action sequences 112 to obtain a set of one or more filtered action sequences 114 (504). User action model 116 is a model of user actions within an application domain. Each of filters 117 specifies a characteristic of an invalid action sequence or an extraneous action of an action sequence. Filters 117 may be informed by user action model 116. In some examples, a human domain expert generates filters 117 based on user action model 116. Sequence filtering unit 104 may apply filters 117 to candidate action sequences to require actions of a candidate action sequence, and the candidate action sequence itself, to conform to filters 117. Each of the one or more filters 117 specifies a characteristic of an invalid candidate action sequence or an extraneous action in an invalid candidate action sequence. As an example, the filters may be candidate filters that cause sequence filtering unit 104 to discard invalid action sequences from the candidate action sequences 112 based on a determination that the action sequence does not satisfy one or more conditions of the candidate filter. In addition, or alternatively, the filters may be action filters that cause sequence filtering unit 104 to discard invalid user actions from an action sequence of candidate action sequences 112 based on a determination that the user action does not satisfy one or more conditions of the action filter. The use of filters 117 allows sequence filtering unit 104 to verify that a candidate action sequence is a valid action sequence composed of valid actions, as informed by user action model 116.

Procedure learning unit 210 of workflow automation unit 211 processes the set of one or more filtered action sequences 106 to generate at least one automated workflow by learning one or more procedures present in the set of one or more filtered action sequences 114 (506). In some examples, the automated workflow includes one or more generalized action sequences. For example, procedure learning unit 210 may process filtered action sequences 114 to create parameterized, automated workflows that may automate a family of tasks or procedures related to the filtered action sequences 114. In other words, procedure learning unit 210 may process filtered action sequences 114 to learn a generalized procedure for a set of action sequences, wherein the generalized procedure includes one or more user actions as an input parameter for the automated procedure so as to create a generalized procedure for the set of action sequences. Further, procedure learning unit 210 may generate at least one automated workflow from the generalized procedures so as to automate the generalized procedures. By examining preconditions associated with actions and/or action sequences, procedure learning unit 210 may identify states in which learned procedures may be applied, thus providing a basis for proactively making suggestions to the user for automating workflows on his behalf. Thus, procedure learning unit 210 may perform automated procedure learning and user workflow generalization by analyzing the set of one or more filtered action sequences 114.

Explanation unit 212 of workflow automation unit 211 processes the set of one or more filtered action sequences 114 to generate one or more explanations for the one or more automated workflows generated by procedure learning unit 210 (508). For example, user action model 116 documents the causality in a mined action sequence. The preconditions and effects of an action sequence characterize the causal structure of the procedure: what the procedure does, when the procedure may be performed (the accumulated preconditions of the procedure), and why the procedure would be done (e.g., the accumulated effects of the procedure). By examining preconditions and effects associated with actions and/or action sequences found in filtered action sequences 114, explanation unit 212 may generate explanations to a user to accompany the suggestions for task automation and/or automated workflows generated by procedure learning unit 210. Thus, explanation unit 212 may use user action model 116 to provide a basis for explaining what an automated workflow or generalized action sequence does, and why the automated workflow would be performed. This information may be useful both for understanding the rationale of "mined" action workflows produced by sequence filtering unit 104 and for understanding the rationale for automated workflows generated by procedure learning unit 210. This information may also be useful for predicting the effects of performing an automated workflow.

Output device 110 outputs, for display to a user, the one or more automated workflows generated by procedure learning unit 210 and the explanation for the one or more automated workflows generated by explanation unit 212 (510). In some examples, in addition or alternatively to outputting the automated workflows and explanation, output device 110 may output other types of information that allows for improvement on a workflow. For example, output device 110 may output one or more of the set of filtered action sequences 114, one or more suggestions for automating one or more workflows, one or more learned procedures, states in which learned procedures may be applied, etc., that a human user may use to improve the workflows.

The techniques described in this disclosure may be implemented, at least in part, in hardware, software, firmware or any combination thereof. For example, various aspects of the described techniques may be implemented within one or more processors, including one or more programmable processors, microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A system for identifying action sequences of user actions for at least one user of a computing system, the system comprising:
    a sequence mining unit comprising processing circuitry and configured to identify patterns of one or more user actions that occur repeatedly from event data and logs of user actions for at least one user of a computing system to generate a set of one or more candidate action sequences each comprising a sequence of one or more user actions;
    a sequence filtering unit comprising processing circuitry and configured to:
        obtain a set of one or more filtered action sequences usable to improve a quality of action sequences identified by the system by applying, to the set of one or more candidate action sequences, at least one of:
            one or more candidate filters that cause the sequence filtering unit to discard one or more invalid action sequences of the one or more candidate action sequences, wherein the one or more candidate filters are generated from a model of user actions for an application domain, or
            one or more action filters that cause the sequence filtering unit to discard one or more invalid user actions of a candidate action sequence of the one or more candidate action sequences, wherein the one or more action filters are generated from the model of user actions for the application domain;
    a workflow automation unit comprising processing circuitry and configured to generate:
        an automated workflow from the one or more filtered action sequences; and
        information based on the automated workflow and the model of user actions for the application domain; and
    an output device configured to output at least one of:
        the automated workflow for performance by a computing system to automate user tasks, or
        the information to modify a workflow performed by a user using the computing system.

2. The system of claim 1, wherein, to obtain the set of one or more filtered action sequences, the sequence filtering unit is configured to:
    apply, to the set of one or more candidate action sequences to obtain the set of one or more filtered action sequences, the one or more candidate filters that cause the sequence filtering unit to discard invalid action sequences of the one or more candidate action sequences.

3. The system of claim 2, wherein the one or more candidate filters cause the sequence filtering unit to discard a candidate action sequence of the one or more candidate action sequences as invalid based on a determination that the candidate action sequence does not begin with a user action that starts a valid action sequence or that the candidate action sequence does not end with a user action that ends a valid action sequence.

4. The system of claim 2, wherein the one or more candidate filters cause the sequence filtering unit to discard a candidate action sequence of the one or more candidate action sequences as invalid based on a determination that the candidate action sequence has an action that starts a process but does not end with a matching action that ends the process.

5. The system of claim 2, wherein the one or more candidate filters cause the sequence filtering unit to discard a candidate action sequence of the one or more candidate action sequences as invalid based on a determination that the candidate action sequence does not begin with a user action that starts a valid branching user action.

6. The system of claim 2, wherein the one or more candidate filters cause the sequence filtering unit to discard a candidate action sequence of the one or more candidate action sequences as invalid based on a determination that one or more actions in the candidate action sequence do not satisfy one or more preconditions from the model of user actions for the application domain at the point in the sequence where it would be executed.

7. The system of claim 1, wherein, to obtain the set of one or more filtered action sequences, the sequence filtering unit is configured to:
    apply, to the set of one or more candidate action sequences to obtain the set of one or more filtered action sequences, the one or more action filters that cause the sequence filtering unit to discard the one or more invalid user actions of the candidate action sequence of the one or more candidate action sequences.

8. The system of claim 7, wherein the one or more action filters cause the sequence filtering unit to discard a user action of the candidate action sequence as invalid based on a determination that the user action is not required by a subsequent user action of the candidate action sequence.

9. The system of claim 7, wherein the one or more action filters cause the sequence filtering unit to discard a user action of the candidate action sequence as invalid based on a determination that the user action does not require any preceding user actions of the candidate action sequence.

10. The system of claim 7, wherein the one or more action filters cause the sequence filtering unit to discard a user action of the candidate action sequence as invalid based on a determination that the user action is a duplicate of another one or more user actions of the candidate action sequence.

11. The system of claim 1,
wherein each of the one or more candidate filters generated from the model of user actions for the application domain specifies a characteristic of an invalid candidate action sequence,
wherein each of the one or more action filters generated from the model of user actions for the application domain specifies a characteristic of an invalid action in a candidate action sequence,
wherein the characteristic of the invalid candidate action sequence and the characteristic of the invalid action in the candidate action sequence are informed by the model of user actions for the application domain.

12. The system of claim 1,
wherein to generate the automated workflow the workflow automation unit is configured to generate, based on the set of one or more filtered action sequences, a generalized action sequence that includes a parameterized user action as an action, wherein the automated workflow comprises the generalized action sequence.

13. The system of claim 1,
wherein the workflow automation unit is configured to generate the automated workflow by learning one or more procedures present in the set of one or more filtered action sequences.

14. The system of claim 13, wherein the workflow automation unit is further configured to:
generate one or more explanations for the automated workflow that indicate a basis of the set of one or more filtered action sequences for generating the automated workflow,
wherein the output device is configured to output the one or more explanations.

15. The system of claim 1,
wherein the one or more candidate filters generated from the model of user actions for the application domain comprise one or more candidate filters generated from the model of user actions for the application domain and a state model of events for the application domain, and
wherein the one or more action filters generated from the model of user actions for the application domain comprise one or more action filters generated from the model of user actions for the application domain and the state model of events for the application domain.

16. A method for identifying action sequences of user actions for at least one user of a computing system, the method comprising:
identifying, by a sequence mining unit comprising processing circuitry, patterns of one or more user actions that occur repeatedly from event data and logs of user actions for at least one user of a computing system to obtain a set of one or more candidate action sequences each comprising a sequence of one or more user actions;
obtaining, by a sequence filtering unit comprising processing circuitry, a set of one or more filtered action sequences usable to improve a quality of action sequences identified by the system by applying, to the set of one or more candidate action sequences, at least one of:
one or more candidate filters that cause the sequence filtering unit to discard one or more invalid action sequences of the one or more candidate action sequences, wherein the one or more candidate filters are generated from a model of user actions for an application domain, or
one or more action filters that cause the sequence filtering unit to discard one or more invalid user actions of a candidate action sequence of the one or more candidate action sequences, wherein the one or more action filters are generated from the model of user actions for the application domain;
generating, by a workflow automation unit comprising processing circuitry:
an automated workflow from the one or more filtered action sequences; and
information based on the automated workflow and the model of user actions for the application domain; and
outputting, by an output device, at least one of:
the automated workflow for performance by a computing system to automate user tasks, or
the information to modify a workflow performed by a user using the computing system.

17. The method of claim 16, wherein obtaining the set of one or more filtered action sequences comprises:
applying, to the set of one or more candidate action sequences to obtain the set of one or more filtered action sequences, the one or more candidate filters that cause the sequence filtering unit to discard invalid action sequences of the one or more candidate action sequences.

18. The method of claim 16,
wherein the method further comprises generating, by the workflow automation unit, the automated workflow by learning one or more procedures present in the set of one or more filtered action sequences.

19. The method of claim 18, further comprising:
generating, by the workflow automation unit, one or more explanations for the automated workflow that indicate a basis of the set of one or more filtered action sequences for generating the automated workflow.

20. A non-transitory computer-readable medium comprising instructions that, when executed, cause processing circuitry of a computing system to:
identify patterns of one or more user actions that occur repeatedly from event data and logs of user actions for at least one user of a computing system to obtain a set of one or more candidate action sequences each comprising a sequence of one or more user actions;
obtain a set of one or more filtered action sequences usable to improve a quality of action sequences identified by the system by applying, to the set of one or more candidate action sequences, at least one of:
one or more candidate filters that cause the sequence filtering unit to discard one or more invalid action sequences of the one or more candidate action sequences, wherein the one or more candidate filters are generated from a model of user actions for an application domain, or
one or more action filters that cause the sequence filtering unit to discard one or more invalid user actions of a candidate action sequence of the one or more candidate action sequences, wherein the one or more action filters are generated from the model of user actions for the application domain;

generate:

an automated workflow from the one or more filtered action sequences; and information based on the automated workflow and the model of user actions for the application domain; and output at least one of:

the automated workflow for performance by a computing system to automate user tasks, or the information to modify a workflow performed by a user using the computing system.

\* \* \* \* \*